3,654,175
METHOD OF GENERATING STABLE FOGS
George L. Henderson, Seattle, Wash., assignor to Applied Technology Corporation, Seattle, Wash.
No Drawing. Filed Dec. 30, 1968, Ser. No. 788,026
Int. Cl. C09k 3/30
U.S. Cl. 252—305                                 11 Claims

ABSTRACT OF THE DISCLOSURE

Disclosed herein is a method of generating stable water mists or "fogs" particularly useful in reducing the risk of frost damage to growing crops. Steam, or preferably a gaseous mixture of steam and combustion gases is passed through a liquid layer of an evaporation retarding chemical such as n-hexadecanol. At the temperature of the gaseous mixture a quantity of the evaporation retarding chemical is vaporized proportional to its vapor pressure at that temperature. The gaseous mixture of steam and chemical vapors or steam, combustion gases and chemical vapors pass upward into the atmosphere where the steam and chemical vapors condense together at substantially the same time and in substantially the same proportions at which they were evaporated, the evaporation retarding chemical forming a saturated monolayer around the surface of each of the condensed water droplets. The combustion gases, being noncondensable at the atmospheric ambient temperature, pass into the atmosphere. Preferably, steam is generated by burning an air-fuel mixture in close proximity to a body of water and ejecting the hot gases, principally carbon dioxide and nitrogen, directly into the water to heat the same and generate steam.

BACKGROUND OF THE INVENTION

Field of the invention

This invention relates to the production of artificially created stable water mists or "fogs."

PRIOR ART RELATING TO THE INVENTION

Each year millions of dollars worth of crops are destroyed or damaged by frost. Various ways have been tried to prevent this loss but none have been found to be satisfactory. Heaters are widely used, because of their cost and limited properties, are effective only for high value crops that are well above ground, such as fruit trees.

It is known that naturally occurring fogs act as a shield to the loss of radiant energy and allow the earth's surface to approach the temperatures found more deeply in the ground. Natural fog, however, only exists under certain specific climatic conditions.

Artificially created fog evaporates in a very few seconds. The evaporation time is dependent on both the temperature and relative humidity. It is possible to reduce the evaporation time by coating artificially created water mists or fogs with a layer of an evaporation retarding chemical that forms a bond with the water. When the chemical becomes closely packed around the water droplets it forms a semi-permeable layer which retards evaporation. Processes for coating water droplets have been described; however, to date a method of producing these stable fogs at an economical cost relative to the value of the product has not been achieved. The coating process is readily accomplished in the laboratory but presents production difficulties in the development of low cost field equipment. An example of laboratory studies conducted on the reduction of the evaporation rate of water droplets by coating the droplets with suitable evaporation retarding chemicals may be found in an article by Eisener, H, Quince B, and Slack C, "The Stabilization of Water Mists by Insoluble Monolayers," Discussions Faraday Society, No. 30, 19690.

SUMMARY OF THE INVENTION

This invention relates to a method of generating stable water mists useful, in particular, for providing frost protection in the same way that clouds prevent frost. Steam or a gaseous mixture of steam and inert gases is passed through a liquid layer of an evaporation retarding chemical, such as a water insoluble, monohydric, fatty alcohol having 16 or more carbon atoms. A particular alcohol most commonly used is n-hexadecanol. The steam or gaseous mixture of steam and inert gases, as it passes through the alcohol layer, vaporizes an amount of the evaporation retarding chemical proportional to its vapor pressure at the gas temperature. As the steam and fatty alcohol vapors move into a zone of lower temperature they condense together at substantially the same time and in substantially the same ratio at which they were evaporated, the fatty alcohol forming a saturated monomolecular layer around the condensed water droplets, thereby reducing the rate of evaporation of the water droplets.

Steam is preferably generated by combustion of a fuel-air mixture in close proximity to a body of water in a container open to the atmosphere, and ejecting the hot combustion gases through a flue extending beneath the surface of the water. The hot combustion gases issue from the lower end of the flue and rise to the surface through the water. Preferably the gases are formed into a multiplicity of small bubbles by interposing a perforated plate just below the surface of the water. By exposing a greater amount of surface area of the hot gases to the body of water heat exchange between the water and hot gases is maximized.

DETAILED DESCRIPTION OF THE INVENTION

Broadly, this process comprises passing steam through a liquid layer of a water insoluble, monohydric long chain fatty alcohol having 16 or more carbon atoms to produce a vaporous mixture of steam and alcohol above the surface of the layer of alcohol. The steam and alcohol vapors condense together at substantially the same time and in substantially the same ratio at which they were evaporated, the fatty alcohol forming a saturated monolayer around the condensed water droplets.

Water insoluble, monohydric, long chain fatty alcohols having 16 or more carbon atoms have been used to coat water surfaces and water droplets to retard and reduce evaporation. The most commonly used alcohol for this puropse has been hexadecanol, although other alcohols such as octadecanol or mixtures of hexadecanol and octadecanol have been used. Each of these alcohols is characterized by a long carbon chain terminated by a hydroxyl group. These hydroxyl groups have the capability of hydrogen bonding with water and water droplets. When they do so the molecules of alcohol orient themselves perpendicular to the surface of the water droplet. When a great many of the molecules become packed together they form a monomolecular layer which acts as a semi-permeable barrier around the drop and reduces its rate of evaporation. When the water droplets are substantially completely coated with a monomolecular film of the perpendicularly oriented alcohol molecules the water drop is said to be coated with a "saturated monolayer." N-hexadecanol, the preferred alcohol of this invention, has a melting point of around 49° C. and a boiling point at atmospheric pressure of about 344° C. N-hexadecanol, however, is an ustable compound and has a rate of decomposition proportional to the absolute temperature.

Decomposition is negligible at temperatures below about 190° F. and it is preferred to operate at temperatures in this range to avoid formation of harmful compounds and loss of the coating chemical.

The simplest way of producing stable water mists or "fogs" according to this invention is by floating a layer of a water insoluble, long chain fatty alcohol such as n-hexadecanol, on the surface of a body of water contained in a container open to the atmosphere, and bubbling steam through the alcohol layer. At the boiling point of water, 212° F. at sea level and atmospheric pressure, an amount of hexadecanol is vaporized proportional to its vapor pressure at that temperature. As the steam and hexadecanol flow upward from the open container and contact the lower temperature of the atmosphere they condense in the same proportions at which they were vaporized, the hexadecanol forming a saturated monolayer around the surface of the condensed water droplets. At an operating temperature around the boiling point of water the rate of decomposition of n-hexadecanol is detrimental. For this reason it is preferred to operate at lower temperatures. This is accomplished by passing a hot gaseous mixture of steam and combustion gases through a liquid layer of a water insoluble, monohydric long chain fatty alcohol having 16 or more carbon atoms, the alcohol floating on the surface of a body of water contained in a suitable container open to the atmosphere. The hot combustion gases bubbling through the water lower the boiling point of the water and thereby reduce the operating temperature. Steam is generated by direct contact of the hot combustion gases with the body of water. A submerged combustion unit, described in applicant's co-pending application Ser. No. 787,650, now abandoned, entitled "Apparatus for Generating Stable Water Mist," is preferred. As described in the above application a propane-air mixture or other suitable fuel mixture is ignited just above the surface of a body of water in a combustion chamber. The hot combustion gases, at a temperature of about 2300° F. using propane, are ejected from the combustion chamber through a flue which extends below the surface of the body of water. The combustion gases contact the water directly and issue from the outlet end of the flue. To generate a maximum amount of steam from the heat energy produced by the combustion the gas stream is broken into a multitude of small gas bubbles, thus exposing a large surface area of the hot gases to the body of water. This is accomplished in one way by forcing the combustion gases to pass through a gas distribution plate having hundreds of small perforations of a predetermined size and density.

The gaseous mixture of steam and hot combustion gases is passed through the liquid layer of fatty alcohol. At the temperature of the gases an amount of the alcohol proportional to its vapor pressure at that temperature is vaporized and passes along with the steam and combustion gases into the atmosphere above the alcohol layer. Several advantages are obtained by using the submerged type heating unit to generate steam needed to produce stable water mists. First, generating steam by a submerged type combustion unit as described is a more efficient method of using heat generated by fuel combustion. Second, the boiling point of water is lowered by the flow of combustion gases through the body of water. Specifically, it has been found that the boiling point of water is lowered from about 212° F. at sea level and atmospheric pressurt to around 188° to 190° F. by flowing hot combustion gases therethrough. Since the boiling point of water is lowered, therate of decomposition of the alcohol and specifically n-hexadecanol is lowered to the point where it becomes negligible.

At the lower temperature the amount of n-hexadecanol vaporized is reduced to that proportional to its vapor pressure at the reduced temperature.

The steam, alcohol vapors and combustion gases pass into the atmosphere above the alcohol layer and are cooled by the atmospheric air to their condensation temperature. The condensation temperature for steam and alcohol vapors is equal to the boiling point of all the components in their respective proportions. The steam and alcohol vapors condense together at substantially the same time and in substantially the same proportions which they are evaporated. The amount of n-hexadecanol, for example, vaporized at an operating temperature of 188–190° F. is sufficient to coat water droplets ranging in size from 1.5 to 2.0 microns, an optimum size for the desired use of the manufactured fogs.

Control of the water droplet size is no problem with the present method as it has been with prior art methods. The steam and alcohol vapor condense together at exactly the same temperature in the proper proportions and in intimate association with each other. Very little excess alcohol is vaporized; therefore the alcohol is very efficiently used.

The amounts of vapor and alcohol used are proportioned in direct ratio to their respective vapor pressures at the operating temperature. The ratio of alcohol to water may be varied by varying the volume flow of combustion gases flowing through the body of water. As the volume of gases varies the boiling point of the system is correspondingly raised or lowered and thus the quantity of alcohol vaporized is correspondingly increased or decreased to that equivalent to its vapor pressure at the increased or decreased operating temperature.

In summary, the method described is an economical and efficient method for generating water mists or fogs. Placement of several of the units at spaced intervals throughout fruit orchards or in areas of the other growing crops has shown the fog generated is of distinct advantage in reducing the risk of frost damage.

The embodiments of the invention in which an exclusive property or privilege is claimed are defined as follows:

1. A method of producing stable water fogs by coating a multiplicity of water droplets with monomolecular films of an evaporation retarding chemical having the capability of hydrogen bonding with water, comprising:
   directing hot gaseous combustion products resulting from ignition of a fuel-air mixture into a mixture of water and evaporation retarding chemical to heat the mixture above the melting point of the chemical but below the boiling point thereof, the water and chemical evaporating at a rate proportional to their respective vapor pressures at the temperature of the water-evaporation retarding chemical mixture, and
   cooling the vaporous mixture to condense the water vapor and evaporation retarding chemical together, the chemical forming a saturated monolayer around the condensed water droplets.

2. The method of claim 1 wherein the evaporation retarding chemical is a water insoluble, long chain monohydric fatty alcohol terminated by a hydroxyl group.

3. The method of claim 1 wherein the water and evaporation retarding chemical are held in a container open to the atmosphere.

4. The method of claim 2 wherein the water insoluble alcohol is floated on the surface of the water.

5. The method of claim 2 wherein the water insoluble alcohol is one having sixteen or more carbon atoms.

6. The method of claim 5 wherein the alcohol is n-hexadecanol.

7. A method of producing stable water fogs by coating a multiplicity of water droplets with monomolecular films of long chain, monohydric alcohols terminated by a hydroxyl group having the capability of hydrogen bonding with water, comprising:
   igniting a fuel-air mixture,
   directing the resulting hot gaseous combustion products into a body of water containing said monohydric alcohol therein, the water contained in a container open to the atmosphere, to heat the water-alcohol and produce a mixture of water vapor and alcohol vapor rising from the container into the atmosphere, the water and alcohol evaporating at a rate proportional to their respective vapor pressures at the temperature of the water-alcohol mixture, and cooling the vaporous mixture of water and alcohol by exposure to the atmosphere above the container, the water vapor and alcohol condensing together with the alcohol forming a saturated monolayer around the condensed water droplets.

8. The method of claim 7 wherein the alcohol is n-hexadecanol.

9. The method of claim 7 wherein the water-alcohol mixture is heated to a temperature not in excess of the boiling point of water.

10. A method of producing stable water fogs by coating a multiplicity of water droplets with monomolecular films of long chain monohydric alcohols having sixteen or more carbon atoms and terminated by a hydroxyl group, the alcohol having the capability of hydrogen bonding with water, comprising:

providing a body of water containing said alcohol therein, the water contained in a container open to the atmosphere, directing hot gaseous combustion products into the water-alcohol and beneath the surface of the water to heat the mixture and produce a mixture of water vapor and alcohol vapor evaporating into the atmosphere at a rate proportional to their respective vapor pressures at the temperature of the water-alcohol mixture, the flow of combustion gases through the water-alcohol mixture lowering the boiling point of water, and cooling the vaporous mixture by contact with the ambient atmosphere, the water vapor and alcohol condensing, with the alcohol forming a saturated monolayer around the condensed water droplets.

11. The method of claim 10 where in the alcohol is n-hexadecanol.

References Cited

UNITED STATES PATENTS

| | | | |
|---|---|---|---|
| 2,451,019 | 10/1948 | Davis | 252—305 |
| 1,594,631 | 8/1926 | Ross | 21—57 |
| 3,316,056 | 3/1967 | Johnson et al. | 21—57 |
| 3,330,069 | 7/1967 | Mihara | 47—2 |

OTHER REFERENCES

Manual of Submerged Combustion, Thermal Research & Engineering Corp., Conshohocken, Pa., pp. 23–25 (1961).

JOHN D. WELSH, Primary Examiner

U.S. Cl. X.R.

47—2; 252—359; 117—100; 126—360; 239—2